United States Patent Office 2,924,068
Patented Feb. 9, 1960

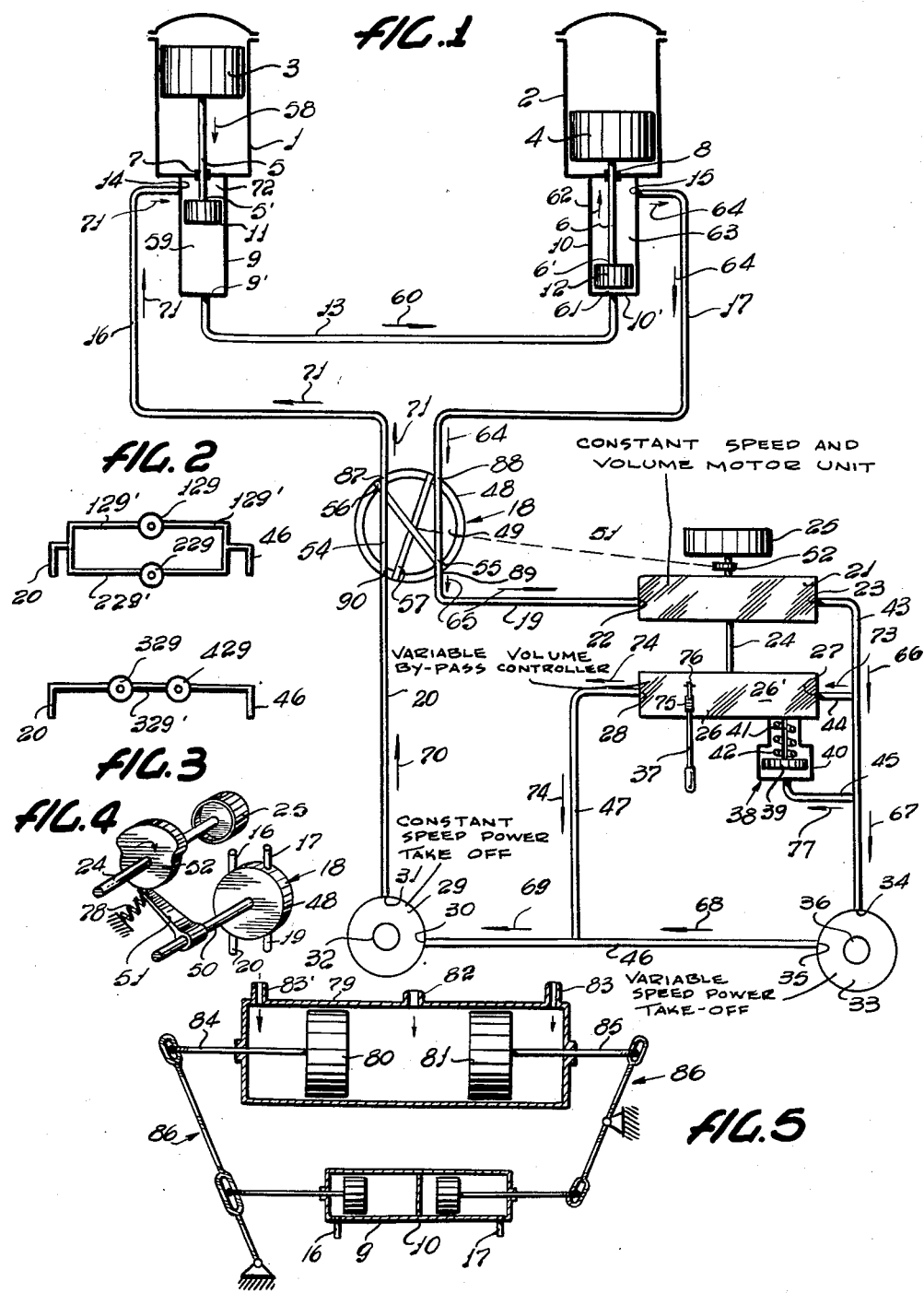

2,924,068

FREE-PISTON ENGINE HYDRAULIC SYSTEM

Celedonio V. Pereda, Buenos Aires, Argentina

Application July 1, 1957, Serial No. 669,302

10 Claims. (Cl. 60—12)

This invention refers to a free-piston engine hydraulic system and more particularly to such a prime-mover provided preferably with at least one constant speed power take-off and at least one variable speed power take-off.

It has been an aim in recent years to increase the efficiency of free-piston engines while at the same time reducing the number of mechanical parts required therefore. Thus, several attempts have been made to eliminate the crank shaft and pivoted linkage between each piston and the crank shaft.

Another concept on this engine design is to maintain the speed of the pistons of the prime-mover within the same speed range as far as possible to reduce wear and tear, in spite of the fact that the power take-off portion may require variation of speed.

The present invention provides a combination which solves the above mentioned problems and in addition provides any number of variable speed power take-offs and constant speed power take-offs, in accordance with the requirement. Such a combination can be used in many different circumstances, for instance in a harvesting machine wherein the constant speed power take-off is used for driving the harvester means and the variable speed power take-off is used for moving the harvester machine on the ground, so that any irregularities on the ground may be overcome by varying the speed of the ground wheels and yet the harvester means are driven always at the same speed and the engine or prime-mover which supplies the power operates substantially at a constant speed.

In view of the fact that in the arrangement according to the invention the crank shaft and related parts are eliminated, the construction becomes considerably cheaper to manufacture. Also the fly-wheel which is required to overcome the dead point of the piston strokes can be considerably smaller, because it is not required to compensate for the large masses of a crank shaft and related parts. What is more, means are provided which effect a counterbalance action between a pair or series of pairs of pistons, so that whilst one piston is driven downwardly in the prime-mover by the expanding force of the ignited fuel, the other piston or series of pistons are driven upwardly by a small part of power supplied by the downwardly driving pistons, so that the fly-wheel actually is only a safety arrangement in case of combustion failures or bad synchronization. Consequently it is apparent to those skilled in the art that the size of the fly-wheel is very small and the size of the entire prime-mover and related parts may be considerably smaller and lighter than in the orthodox types now used.

Obviously, if more than one pair of pistons is used, the pairs may be arranged in staggered relationship.

In short, the present invention relates to a free-piston engine hydraulic system provided with at least one constant speed power motor take-off having an inlet port and an outlet port, and/or at least one variable speed power motor take-off having an inlet port and an outlet port.

Thus, it is an object of the present invention to provide a free-piston hydraulic system which may provide different speeds while maintaining a substantially constant power generating range.

Another object is to provide a free-piston engine hydraulic system provided with a small fly-wheel, so that the volume required for the entire arrangement is considerably smaller than that of a driven piston prime-mover, for the same amount of power of any of the well known types.

Still another object is to provide a free-piston engine hydraulic system having a constant speed power take-off and a variable speed power take-off, wherein said variable speed power take-off is provided with means for automatic control of the speed which said take-off will supply, in accordance with the load or resistance which has to be overcome thereby and at the same time said variable speed power take-off may be provided with an additional control means for varying the speed, which control means is controlled at will.

A further object is to provide a prime-mover of the above-mentioned type, which in accordance with the requirement may have as many constant speed power take-offs and variable speed power take-offs, as may be required.

From the foregoing it is apparent that the invention is herein being described in relationship to the fundamental concept of this new outlay and it will be obvious that the invention may be carried out into practice in many different ways as far as the structural arrangement of the integrating part is concerned, so that it is considered unnecessary to enter into details thereabout.

These and further objects and advantages of the present invention will become more apparent during the course of the following description, wherein by way of example several embodiments are shown in the accompanying drawings, wherein:

Fig. 1 is a schematical layout of the free-piston engine hydraulic system in accordance with the present invention.

Fig. 2 is a schematical layout of the hydraulic system of two power take-offs in parallel.

Fig. 3 is a schematical layout of two power take-offs in series.

Fig. 4 is a schematical perspective view showing means for controlling the position of the hydraulic controller by the shaft supporting the fly-wheel.

Fig. 5 is a schematical layout of a modified part of the arrangement shown in Fig. 1.

As may be seen in Figure 1, the prime-mover includes a pair of cylinders 1 and 2 in which freely movable pistons 3 and 4, respectively, are slidably arranged. The pistons of this prime-mover may be driven according to the well-known principles of internal combustion engines.

The pistons 3, 4 each have piston rods 5, 6, respectively passing through bushings 7, 8, into fluid housing cylinders 9, 10, respectively. Secured to the free ends 5′, 6′ of the piston rods are plungers 11, 12, respectively.

The base portion 9′ and 10′ of the fluid housing cylinders 9, 10 are interconnected through a pipe 13, which functions as counterbalancing means, to which reference will be made later on.

The upper portions of cylinders 9 and 10 adjacent cylinders 1 and 2 are provided with ports 14, 15 to which pipes 16, 17 are respectively connected. A two way position distributor 18, is connected to said pipes 16 and 17, and furthermore to pipes 19 and 20.

Pipe 19 is furthermore connected to a constant speed and volume driven motor unit 21 of the constant displacement expansible chamber type, having an inlet 22 and an outlet 23. Said motor unit 21 may be of any rotary type having a fluid inlet connecting the outside with a rotor (not shown) and a fluid outlet. The fluid drives the rotor, as is well known in the art.

A shaft 24 supports the rotor (not shown) of unit 21 and emerges to the outside of the casing of unit 21 to support a small fly-wheel 25, and to further be connected to the rotor (not shown) of a variable volume by-pass controller 26, which is likewise of well known structure and for instance of the Hele-Shaw variable delivery pump type (see Oil Hydraulic Power and its industrial application, by Water Ernst, M. E., first edition, McGraw Hill Book Co., Inc., 1949, page 114), or of the Oilgear variable delivery pump type (same text book, page 120).

In other words, the variable volume by-pass controller comprises a housing 26', having an inlet 27, and an outlet 28. Inside said housing, and mounted on shaft 24 is a rotor (not shown), which is eccentrically housed within housing 26'. By varying the eccentricity, the amount of fluid which is transported through the variable volume by-pass controller, from the inlet 27 towards the outlet 28 is varied, as is well known by those skilled in the art. The variable volume by-pass controller may be voluntarily controlled by means of a hand operated or remote controlled lever 37, which enables variation, at will, of the above mentioned eccentricity.

The variable volume by-pass controller 26 further comprises a fluid pressure responsive device 38, including a spring urged piston 39 slidably mounted in a cylinder 40, and having a piston rod 41 entering said housing 26', to likewise control the eccentricity of said variable volume by-pass controller. Spring 42 comprises two ends, one of which abuts against the rear face of piston 39, whilst the other end abuts against the housing. The front face of piston 39 is subject to fluid pressure as will be better understood later on.

The arrangement is further provided with a constant speed power take-off 29, having an inlet port 30, and an outlet port 31. A shaft 32 constitutes the actual power take-off, and reference numeral 33 indicates a variable speed power take-off device having an inlet port 34, an outlet port 35, and a shaft 36.

Both power take-offs 30 and 33 are of the sliding vane, piston or rotary turbine type, well known in the art, whereas fluid is supplied to the inlet port 30 or 34 to rotate the rotor (not shown) and leaves the power take-off through the outlet port 31 or 35. Power is taken off from shafts 32 and 36.

A pipe 43 connects the outlet 23 of the constant speed and volume driven unit 26 with the inlet port 34 of the variable speed driven power take-off 33 and with the inlet 27 of the variable volume by-pass controller 26 through branch 44, and furthermore through branch 45 with the front face of the spring urged piston 39 of the fluid pressure responsive device 38.

Pipe 46 connects the outlet port 35 of the variable speed power take-off 33, with the inlet port 30 of the constant speed power take-off 29, and branch 47 connects the outlet 28 of the variable volume by-pass controller 26, with the inlet port 30 of the constant speed power take-off 29, through a portion of pipe 46.

Pipe 20 connects the outlet port 31 of the constant speed power take-off 29 with the two way position distributor 18.

The distributor itself may be of any of the known types, and in the drawing a very simple type is shown, consisting of a housing 48 in which a rotary disk 49 is rotatably mounted. As may be better seen in Fig. 4, a shaft 50 projects through housing 48 and rotatably supports said rotary disk 49. A cam follower 51 is mounted on shaft 50 and is in contact with cam 52 mounted on shaft 24. A spring 78 urges the free end of cam follower 51 against the active surface of cam 52. Cam 52 is so designed that the rotary disk 49 may occupy either of two end positions, one being shown in Fig. 1. Thus, the rotary disk 49 is able to rotate through a small angular extent in clockwise and counterclockwise direction, to either connect first and second admission ports 87, 88 and pipes 16 and 17 through parallel ducts 54, 55, respectively with discharge port 89 and third admission port 90 and pipes 19, 20 or crossing ducts 56, 57 will connect pipe 16 with pipe 19, and pipe 17 with pipe 20. That way the rotary disk 49 requires the minimum power for operation, due to the small angular movement it has to carry out.

As to the operation of the arrangement, and with regard to the position shown in Fig. 1, assuming that at this moment an expanding force of ignited fuel starts to act on the upper face of piston 3, the latter is driven downwardly as shown by arrow 58, whereby the fluid housed in the space 59 of the cylinder 9 is discharged through pipe 13 in the direction shown by arrow 60 into space 61 in cylinder 10 beneath plunger 12 thereby raising plunger 12 and piston 4 in the direction shown by arrow 62 and compressing the fuel housed above the upper face of piston 4. At the same time the fluid housed in space 63 in cylinder 10 is displaced by plunger 12 into pipe 17 in the direction shown by arrows 64, and therefrom through duct 55 into pipe 19, in the direction shown by arrow 65, to pass through the constant speed and volume driven unit 21 by entering through the inlet 22 and leaving through the outlet 23 into pipe 43. This way the rotor (not shown) of the constant speed and volume driven unit 21 starts to rotate and therewith shaft 24 and fly-wheel 25 which starts to accumulate kinetic energy.

Assuming that in this event the eccentricity of the variable volume by-pass controller 26 is zero, then all the fluid entering pipe 43 through the outlet 23 will pass in the direction shown by arrows 66 and 67 into the variable speed power take-off 33 through the inlet port 34, the shaft 36 of which thus rotates at maximum speed and the fluid will carry on its path through the outlet port 35 into pipe 46 in the direction indicated by arrows 68 and 69 through the inlet port 30 into the constant speed power take-off 29 which will thus rotate at the same speed as the variable speed power take-off 33 and therefrom through the outlet port 31 in the direction indicated by arrow 70 through pipe 20 into duct 54 of distributor 18 and therefrom through pipe 16 in the direction indicated by arrows 71 into the space 72 of fluid housing cylinder 9, where the plunger 11, at this moment, is being driven downwardly.

If on the other hand, lever 37 of the variable volume bypass controller 26 is located in a position corresponding to a certain eccentricity, part of the fluid entering pipe 43 will be branched off through branch 44 in the direction indicated by arrow 73, to additionally drive the rotor of the variable volume by-pass controller 26, by entering into housing 26' through the inlet 27 and leaving the former through the outlet 28, into branch 47 in the direction indicated by arrows 74 to join the pipe 46 at the portion indicated by arrow 69. In this event, since only part of the fluid passes through the variable speed power take-off 33, the latter will rotate at a lower speed than the constant speed power take-off 29, which in all events receives the entire volume of fluid which leaves the first outlet 23.

This way the speed of the variable speed power take-off may be manually controlled by lever 37 which puts into inoperative conditions the fluid pressure responsive device 38, since lever 37 will be blocked in the desired position, for instance by a ratchet gear arrangement 75 and pawl 76, only schematically indicated in Fig. 1.

This arrangement is used in the above described way, wherever it is required, to voluntarily control the speed of shaft 36, for instance in a lathe or the like machine, a motor car, etc.

If pawl 76 is withdrawn from ratchet gear 75, the fluid pressure responsive device 38 becomes operative.

Assuming for instance, that shaft 36 is connected to the ground wheels of a vehicle, upon increasing the resistance or load on shaft 36, such as if the vehicle has to climb a slope, the counterpressure at the inlet port 34 will increase and thereby also the pressure of the fluid in branch 45 will increase, as indicated by arrow 77 and thereby piston 39 will be moved towards the housing 26', overcoming the pressure of spring 41 and varying thereby the eccentricity of the variable volume by-pass controller 26 in such a way, that more fluid passes in the direction of arrows 73 and 74 and thereby the speed on shaft 36 is decreased and the vehicle will be able to climb the slope.

As soon as piston 3 has reached its lower dead point, shaft 24 has rotated through 180° and thereby cam 52 operates on cam follower 51 which in turn moves the rotary disk 49 so that duct 56 connects pipe 16 with pipe 19 and duct 57 connects pipe 17 with pipe 20. At substantially the same instant, the compressed fuel housed above piston 4 is ignited and piston 4 is driven downwardly, so that the direction of arrows 60, 71 and 64 will be reversed, whilst the direction of the remaining arrows remains the same, so that the fluid in the portion below the distributor 18 is maintained constantly in the same flow direction, and thereby the power supplied to shafts 36 and 32 remains constant as long as there is no variation in the variable volume by-pass controller 26.

The number of the constant speed power take-offs and of the variable speed power take-offs may be increased at will by parallel arrangements such as shown in Fig. 2 or arrangements in series, such as shown in Fig. 3.

In Fig. 2 two constant speed power take-offs 129 and 229 are shown, connected to pipes 46 and 20 through parallel branches 129' and 229'.

In Fig. 3 two constant speed power take-offs 329 and 429 are connected to pipes 20 and 46 through pipe 329'.

It will be obvious, that in view of the hydraulic or pneumatic arrangement, the power take-offs may be easily arranged at any spot, where required.

Whilst sofar I have described my invention in connection with at least a pair of prime-mover cylinders 1 and 2, I can obviously achieve the same result with a dual cylinder arrangement, such as shown in Fig. 5, wherein cylinder 79 comprises two pistons 80 and 81 which receive fuel either through port 82 or simultaneously through ports 83 and 83', as is well known in the art, whereby the counterbalance arrangement, such as provided by pipe 13 becomes unnecessary. The piston rods 84 and 85 may either be directly connected to the plungers such as plungers 11 and 12, as described in connection with Fig. 1, or if it is desired that the fluid housing cylinders 9 and 10 are arranged in spaced apart relationship with regard to cylinder 79, they may be connected to the rods 84 and 85 for instance through a lever arrangement 86 as shown in Fig. 5.

The embodiment shown in Fig. 5 has merely been described in order to demonstrate that the structural detail can be substantially varied without departing from the gist of the invention.

Finally it may be stated, as will be apparent to those skilled in the art, that the arrangement according to the present invention is preferably applied to two stroke engines, and that obviously the arrangement, for certain circumstances can be used with either variable speed power take-offs, such as 33 or with constant speed power take-offs, such as 29, only.

Furthermore, instead of using the device as shown and described in connection with Fig. 4 for controlling the distributor 18, any other type of control could be provided.

I claim:

1. A free-piston engine hydraulic power transmission system comprising a prime mover including at least two cylinder-mounted pistons reciprocably movable in opposite directions with respect to each other; each of said cylinder-mounted pistons having connected thereto a plunger slidably movable within a fluid housing cylinder; a fluid distributor having at least a first two admission openings; first conduit means connecting one of said admission openings with the fluid housing cylinder of a first one of said cylinder-mounted pistons and second conduit means connecting another of said admission openings with the fluid housing cylinder of a second one of said cylinder-mounted pistons; said distributor having also an outlet and a third admission opening; a constant speed and volume motor unit having an inlet connected to said distributor outlet and an outlet, said motor unit having a rotor provided with a rotor shaft; a variable volume by-pass controller having a rotor driven by the rotor shaft of said constant speed and volume motor unit, an inlet and an outlet; a variable speed power take-off motor unit having an inlet, an outlet, and an output shaft; a constant speed power take-off motor unit having an inlet, an outlet, and an output shaft; said variable speed power take-off unit and said variable volume by-pass controller being connected in parallel with their inlets connected to the outlet of said constant speed and volume motor unit and their outlets connected to the inlet of said constant speed power take-off unit; the outlet of said constant speed power take-off being connected to the third admission opening of said distributor; means for adjusting the variable volume by-pass controller to control the volume of fluid passing therethrough and thus control the volume of fluid passing through and consequently the speed of the variable speed power take-off unit connected in parallel thereto; and means for periodically controlling said distributor to alternately connect one of the said first two admission openings with the distributor outlet and the other of said admission openings with the distributor third admission opening in synchronism with the movement of said reciprocably and oppositely movable cylinder-mounted pistons whereby upon movement of the pistons in opposite directions fluid will be transmitted through the distributor, through the constant speed and volume unit, through the parallel-connected variable volume by-pass controller and variable speed power take-off, through the constant speed power take-off, and through the distributor to the other fluid housing cylinder.

2. A free-piston engine hydraulic power transmission system as defined in claim 1 wherein said means for periodically controlling the distributor comprises cam means conected to the rotor shaft of said constant speed and volume motor unit.

3. A free-piston engine hydraulic power transmission system as defined in claim 2 and further including a flywheel connected to the rotor shaft of said constant speed and volume motor unit.

4. A free-piston engine hydraulic power transmission system as defined in claim 1 wherein the pistons are oppositely mounted in a single cylinder to form a two-stroke prime mover.

5. A free-piston hydraulic power transmission system as defined in claim 1 and further including counterbalance means connected intermediate said fluid housing cylinders for counterbalancing the movements of said plungers comprising a conduit connected at each end to the ends of said fluid housing cylinders opposite the ends thereof which are connected to the distributor admission openings.

6. A free-piston engine hydraulic power transmission system as defined in claim 1 wherein said means for adjusting the variable volume by-pass controller includes a fluid pressure control device automatically responsive to the fluid pressure at the inlet of the variable speed power take-off unit.

7. A free-piston engine hydraulic power transmission system as defined in claim 6, wherein said means for adjusting the variable volume by-pass controller further includes manually-operable lever means.

8. A free-piston engine hydraulic power transmission system as defined in claim 1 wherein said pistons are separately mounted in spaced piston cylinders.

9. A free-piston engine hydraulic power transmission system comprising a prime mover including at least two cylinder-mounted pistons reciprocably movable in opposite directions with respect to each other; each of said cylinder-mounted pistons having connected thereto a plunger slidably movable within a fluid housing cylinder; a fluid distributor having at least a first two admission openings; first conduit means connecting one of said admission openings with the fluid housing cylinder of a first one of said cylinder-mounted pistons and second conduit means connecting another of said admission openings with the fluid housing cylinder of a second one of said cylinder-mounted pistons; said distributor having also an outlet and a third admission opening; a constant speed and volume motor unit having an inlet connected to said distributor outlet and an outlet, said motor unit having a rotor provided with a rotor shaft; a flywheel connected to said rotor shaft; a constant speed power take-off unit having an inlet connected to the outlet of said constant speed and volume motor unit, an outlet connected to the third admission opening of said distributor, and an output shaft; and means for periodically controlling said distributor to alternately connect one of the said two admission openings with the distributor third admission opening in synchronism with the movement of said reciprocably and oppositely movable cylinder-mounted pistons.

10. A free-piston engine hydraulic power transmission system comprising a prime mover including at least two cylinder-mounted pistons reciprocably movable in opposite directions with respect to each other; each of said cylinder-mounted pistons having connected thereto a plunger slidably movable within a fluid housing cylinder; a fluid distributor having at least a first two admission openings; first conduit means connecting one of said admission openings with the fluid housing cylinder of a first one of said cylinder-mounted pistons and second conduit means connecting another of said admission openings with the fluid housing cylinder of a second one of said cylinder-mounted pistons; said distributor having also an outlet and a third admission opening; a constant speed and volume motor unit having an inlet connected to said distributor outlet and an outlet, said motor unit having a rotor provided with a rotor shaft; a variable volume by-pass controller having a rotor driven by the rotor shaft of said constant speed and volume motor unit, an inlet and an outlet; a variable speed power take-off motor unit having an inlet, an outlet, and an output shaft; said variable speed power take-off unit and said variable volume by-pass controller being connected in parallel with their inlets connected to the outlet of said constant speed and volume motor unit and their outlets conected to the third admission opening of said distributor; means for adjusting the variable volume by-pass controller to control the volume of fluid passing through and consequently the speed of the variable speed power take-off unit connected in parallel thereto; and means for periodically controlling said distributor to alternately connect one of the said two admission openings with the distributor outlet and the other of said admission openings with the distributor third inlet in synchronism with the movement of said reciprocably and oppositely movable cylinder-mounted pistons.

References Cited in the file of this patent

UNITED STATES PATENTS

| 2,074,618 | Roeder | Mar. 23, 1937 |
| 2,230,760 | Pateras Pescara | Feb. 4, 1941 |
| 2,473,204 | Huber | June 14, 1949 |
| 2,584,981 | Bright | Feb. 12, 1952 |

FOREIGN PATENTS

| 456,232 | Great Britain | Nov. 5, 1936 |